(12) United States Patent
Marggraff et al.

(10) Patent No.: US 10,762,414 B1
(45) Date of Patent: Sep. 1, 2020

(54) SYSTEMS AND METHODS FOR SHARING AN ARTIFICIAL INTELLIGENCE PERSONALITY

(71) Applicants: Lewis James Marggraff, Lafayette, CA (US); Nelson George Publicover, Bellingham, WA (US); Mary Jo Marggraff, Lafayette, CA (US)

(72) Inventors: Lewis James Marggraff, Lafayette, CA (US); Nelson George Publicover, Bellingham, WA (US); Mary Jo Marggraff, Lafayette, CA (US)

(73) Assignee: KINOO, INC., Mountain View, CA (US)

( * ) Notice: Subject to any disclaimer, the term of this patent is extended or adjusted under 35 U.S.C. 154(b) by 0 days.

(21) Appl. No.: 16/389,856

(22) Filed: Apr. 19, 2019

Related U.S. Application Data

(60) Provisional application No. 62/660,237, filed on Apr. 19, 2018.

(51) Int. Cl.
*G06N 99/00* (2019.01)
*G06N 3/00* (2006.01)
*G06K 9/00* (2006.01)

(52) U.S. Cl.
CPC .............. *G06N 3/006* (2013.01); *G06N 3/008* (2013.01); *G06N 99/00* (2013.01); *G06K 9/00335* (2013.01)

(58) Field of Classification Search
CPC ..................................................... G06N 99/00
USPC ............................................................ 706/12
See application file for complete search history.

(56) References Cited

U.S. PATENT DOCUMENTS

2016/0042648 A1* 2/2016 Kothuri .................. G06F 3/015
434/236

* cited by examiner

*Primary Examiner* — Lut Wong
(74) *Attorney, Agent, or Firm* — William A. English; Vista IP Law Group LLP

(57) ABSTRACT

Systems and methods are described for sharing an artificial intelligence personality (AIP) among multiple human interaction entities (HIEs). An AIP is an understanding construct that interacts with one or more humans in a human- or pet-like manner, implementing a variety of communication experiences to support a sense of ongoing social connectedness. HIEs may include robots, robotic pets, toys, and avatars. The system may be implemented using two or more HIEs and, optionally, one or more remote and/or distributed processors to compute AIPs and sequence telecommunications. AIPs are periodically updated primarily based on human interactions sensed by the two or more HIEs. HIEs may continue to operate without interruption in the presence of significant telecommunications delays. The systems may provide two or more users with intuitive machine companions that exhibit an integrated knowledge base and personality cumulatively acquired from all users.

20 Claims, 10 Drawing Sheets

SYSTEMS AND METHODS FOR SHARING AN ARTIFICIAL INTELLIGENCE PERSONALITY

RELATED APPLICATION DATA

The present application claims benefit of provisional application Ser. No. 62/660,237, filed Apr. 19, 2018, the entire disclosure of which is expressly incorporated by reference herein.

FIELD OF THE INVENTION

The present invention relates generally to systems and methods for substantially sharing an artificial intelligence personality (AIP, or artificial personality, AP) among multiple human interaction entities (HIEs). The system utilizes techniques within the fields of machine learning [including artificial intelligence (AI), artificial neural networks (ANNs), convolution neural networks (CNNs), and deep learning], human-machine interfaces (HMIs), and telecommunications. The system may provide two or more users with machine companions that exhibit intuitive interactions, a cumulatively acquired personality, an integrated knowledge base, and behaviors to motivate emotional and cognitive exchanges, and/or to improve a sense of connectedness and remove feelings of social isolation between users.

BACKGROUND

There is a recognized need for companionship for many lonely, isolated, and/or confined people. Individuals who lack social interaction, support, and regular contact from friends, family, or colleagues frequently become depressed; their health suffers; their life span may be reduced; and they sometimes even become suicidal. Groups of people with an increased tendency for suffering from these effects include the elderly, disabled, prisoners, institutionalized or hospitalized individuals, researchers in extreme conditions, and astronauts.

One particular environment, space, is often characterized as an "ICE", or Isolated, Confined, and Extreme condition. The National Aeronautics and Space Administration (NASA) has recognized the negative impact of the ICE condition for astronauts who may be relatively isolated for lengthy periods, whether aboard the international space station (ISS), on future moon or planetary bases, and during extended travel to Mars and beyond. The isolation is compounded by the delay in communication, fundamentally limited by the speed of light, between earth and astronauts.

As distances increase, so do the delays in communication. The relatively short delay of 1.25 seconds from the Earth to the moon, dictates that response times in dialogue exchanges increase and "real-time" communication generally turns out to be difficult or infeasible. One-way transfer of information to Mars can take as much as twenty minutes, eliminating the possibility for a real-time dialogue with people on Earth. As the durations of space expeditions increase, additional 'care package' provisions from home become less frequent or are not practical. With a limited crew size of four to six (4-6), today, and constrained due to limited on-board resources for the foreseeable future, variety in social interactions is limited.

NASA has determined that mitigating astronauts' separation of social support from family and close friends during long-duration space expeditions is important to prevent declines in crew behavioral health and performance. The impact on astronauts is partly due to these response time delays and partly due to the absence of their critical social support network. The need for countermeasures to mitigate the loss of astronauts' Earthbound social support is documented but unresolved.

Attempts have been made for several decades to provide various forms of artificial human companions. These efforts include both hardware and software entities designed to provide companionship. Earlier versions include the virtual "Tamagotchi" characters who required human attention to survive, the hamster-like "Furbie", and a variety of toys, robots, and artificial pets. Notable artificial pets and associated companies include Sony's Aibo robotic dog, Omron's NeCoRo robotic cat, GeriJoy's companion avatar, and Pandorabot's intelligent, conversational agents. Fundamentally, these artificial companions are designed to improve the quality of life for their users, by increasing social interaction.

Artificial human companions, however, have not yet solved the problem of social isolation, and will not replace the familiar, supportive social interaction with family members, loved ones, friends, other colleagues. While advances in AI are increasing the quality and believability of artificial dogs, cats, avatars, and other virtual or physical robots and pets; people are not yet willing to fully suspend disbelief to view an artificial entity as a replacement companion.

While there are improved interactions and conversations enabled with audio, visual, and biological sensors combined with AI to analyze the emotions of users through facial expressions, body language, voice, and various biological measurements (heart rate, galvanometric skin signals, electroencephalograms (EEGs), electrocardiograms (ECGs), etc.), when users are asked implicitly, or explicitly, to suspend disbelief that the artificial companion is "real", their reluctance to do so limits the benefits of social engagement that a person would experience with a real, familiar, close companion. As yet, autonomous, artificial companions are more effective for users with compromised cognition, such as dementia, and less believable and impactful for persons with full cognitive function.

In cases where humans power or augment a companion, whether visibly (through an avatar version of the human), or invisibly (by directing the behavior of, for example, an avatar or robot, in other ways), human support is required, which is not easily or cost effectively scalable. Humans must be hired, trained, managed, and monitored to assure that they are providing quality service through an avatar or other artificial companion. Furthermore, this solution is exacerbated when communications are delayed and/or unreliable.

Further, each of these artificial entities provides only one-on-one companionship with its user. Lacking in these scenarios are the social or group dynamics that are key characteristics of interactions with family, relatives, close friends, organizations (e.g., religious, support groups), professional colleagues, classmates, and so on.

More recently, NASA's Astrobee and Airbus' CIMON robotics have been designed to provide assistance and companionship to astronauts in ICE conditions aboard the International Space Station. As with other AI based companions, these devices still require the suspension of disbelief by astronauts to become meaningful companions, and also do little to connect space travelers with their earthbound or distant human social network of support.

New paradigms are required to provide a technology-driven social support system that one would experience when engaging with, for example, close friends, family, and colleagues. The basic functions of a social support system provide: 1) companionship in a tangible form that supports the feeling of 'belonging to', 2) emotional or esteem support that interprets and translates moods to create caring and empathy, and 3) information that is curated with suggested solutions or exchanges that result in positive outcomes through a conveyance of text, images, movement, sound, and other modalities. To be effective, support functions must be integrated from multiple sources and provide positive support in a variety of ways.

SUMMARY

In view of the foregoing, systems and methods are provided herein for substantially sharing an artificial intelligence personality (AIP) or "character" among multiple human interaction entities (HIEs) implementing a variety of non-real time communication experiences, or in real-time as communications systems enable, to support a sense of ongoing social connectedness. An AIP is an understanding construct that interacts with one or more humans in a human- or pet-like manner. HIEs may include robots, robotic pets, toys, digital assistants, and avatars that may be physical or virtual. The system may be implemented using two or more HIEs and, optionally, one or more remote and/or distributed processors to compute AIPs and sequence telecommunications. AIPs are periodically updated based primarily on interactions sensed and/or performed by the two or more HIEs. The system may provide two or more users with intuitive machine companions that demonstrate an integrated knowledge base and personality cumulatively modified based on interactions with all (or a selected subset of) users. The system may exhibit behaviors to motivate emotional and cognitive exchanges among one or more of its users.

In accordance with an exemplary embodiment, a system is provided to substantially share an artificial intelligence personality among multiple human interaction entities that includes a first human interaction entity instantiated with a first artificial intelligence personality; a second human interaction entity instantiated with the first artificial intelligence personality; a coordinating processor configured to compute artificial intelligence personalities; one or more sensors operatively coupled to at least one of the first and second human interaction entities communicating update data to the coordinating processor; wherein the coordinating processor is configured to compute a new artificial intelligence personality based at least in part on the first artificial intelligence personality and the update data; and an interface for transmitting one of the new artificial intelligence personality and sufficient data components to compute the new artificial personality, from the coordinating processor to the multiple human interaction entities, whereupon the first and second human interaction entities are instantiated with the new artificial intelligence personality.

In accordance with another exemplary embodiment, a system is provided to substantially share an artificial intelligence personality among multiple human interaction entities that includes a first human interaction entity instantiated with a first artificial intelligence personality; a second human interaction entity instantiated with the first artificial intelligence personality; one or more sensors operatively coupled to the first human interaction entity; a coordinating processor for determining a second artificial intelligence personality based at least in part on the first artificial intelligence personality and update data acquired from the one or more sensors operatively coupled to the first human interaction entity; a first processor instantiating the first human interaction entity with the second artificial intelligence personality; a communication interface for transmitting sufficient data to compute the second artificial intelligence personality from the first artificial intelligence personality to the second human interaction entity; and a second processor instantiating the second human interaction entity with the second artificial intelligence personality.

In accordance with still another exemplary embodiment, a method is provided substantially share an artificial intelligence personality among multiple human interaction entities that includes instantiating, with a first processor operatively coupled to a first human interaction entity, a first artificial intelligence personality into the first human interaction entity; instantiating, with a second processor operatively coupled to a second human interaction entity, the first artificial intelligence personality into the second human interaction entity; acquiring artificial intelligence personality update data from one or more sensors operatively coupled to the first human interaction entity; determining a second artificial intelligence personality based at least in part on the first artificial intelligence personality and the artificial intelligence personality update data; instantiating, with the first processor, the second artificial intelligence personality into the first human interaction entity; transmitting to the second human interaction entity, the second artificial intelligence personality update data, and instantiating, with the second processor, the second artificial intelligence personality into the second human interaction entity.

Other aspects and features including the need for and use of the present invention will become apparent from consideration of the following description taken in conjunction with the accompanying drawings.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently exemplary embodiments are illustrated in the accompanying drawings, in which.

DETAILED DESCRIPTION OF THE EXEMPLARY EMBODIMENTS

Figure 1:
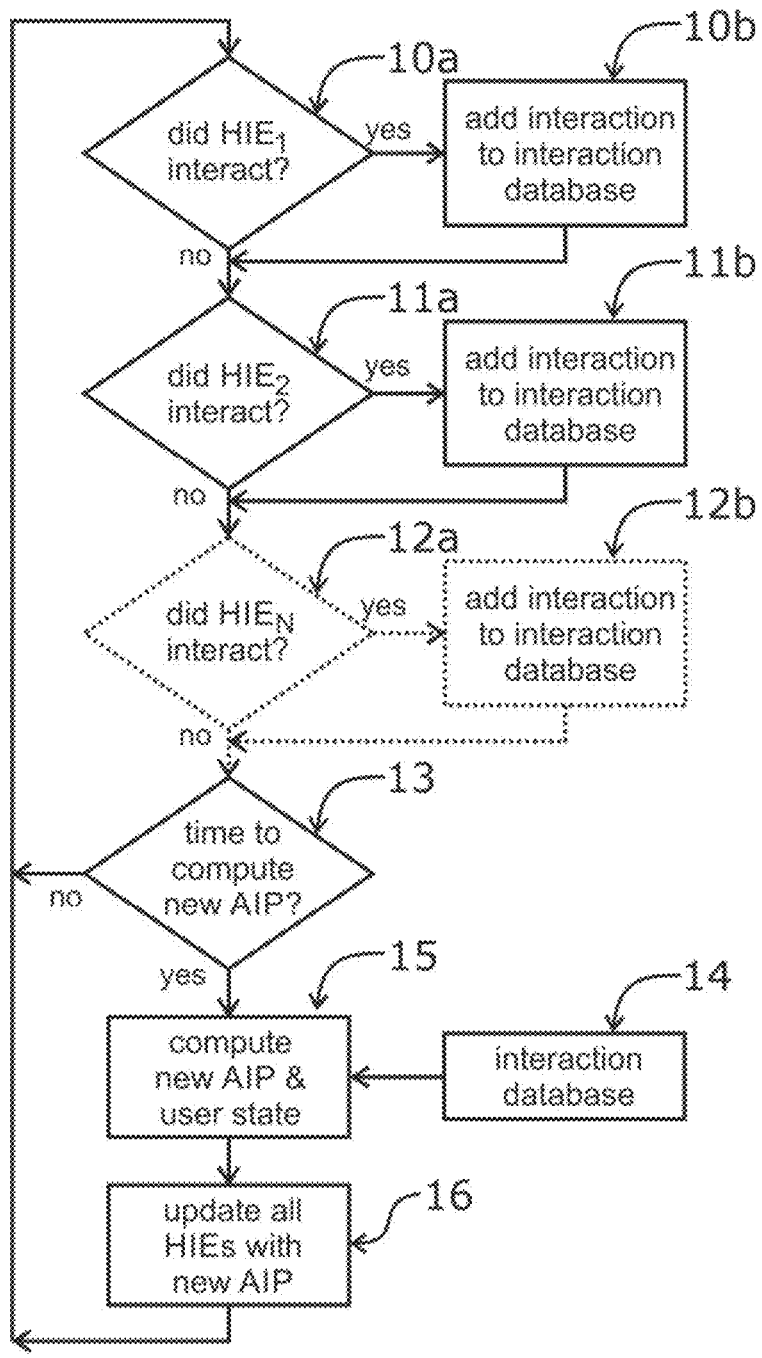
FIG. 1 is a flowchart illustrating an exemplary sequence of steps to substantially share a single AIP among two or more HIEs.

In exemplary embodiments, an artificial intelligence personality (AIP) is substantially shared among two or more human interaction entities (HIEs). HIEs facilitate a wide range of non-real time communication experiences, usually separated by significant distances, to support a sense of ongoing social connectedness. The system may be implemented using two or more HIEs and, optionally, one or more remote and/or distributed processors to compute updated AIPs and/or sequence telecommunications. AIPs are periodically updated based primarily on human interactions sensed by the two or more HIEs, or following pre-determined intervals. The AIPs may also be updated based upon ongoing computation and/or some form of direction provided by other parties such as psychologists, counsellors, teachers, advisors, supervisors, NASA personnel, other humans, and/or other AIPs.

The system may provide two or more users with intuitive machine companions that exhibit an integrated knowledge base and a personality cumulatively acquired from all, or a subset of, interactions, or simulated or potential interactions, with users. Experiences may reflect and motivate appropriate social interactions to evoke emotions and which reinforce bonding, connectedness, and regular reminders of the social pact that exist between the humans, even when separated by large distances. Since all HIEs know (as allowed by each user) of all activities by all human members of a network, HIEs may decide what, how, when, and why to share information, experiences, emotions, or interactions with any members of a group to amplify social interchange.

A vast array of interactions experienced by one HIE may be shared with others. Some examples of "milestone" and other events that may trigger this form of sharing via one or more remote HIEs include: receiving a raise, a child taking a first step or losing a first tooth, acing a test, having a birthday, winning a ball game, eating something delicious, listening to a great song, watching a cool movie, capturing an awesome photograph, playing a practical joke, and so on. Such sharing, particularly when separated by long distances, may be a vital part of feeling "connected."

Reactions and behaviors of the humans may be shared via curation and/or interpretation by HIEs to engage in an educational interchange of information, demonstrations of learning, and/or advancement of thought regarding a topic area. In other words, the entities or the humans may establish, maintain, and/or swap roles as students or teachers for remote educational experiences. A HIE may be taught by one or more humans and pass this new learning on to other humans via one or more coupled HIEs. Teaching may be formal or informal, including tricks, dances, games, songs, news, forms of affection, friendly mischievous activities, and forms of language.

In addition to interpreting, curating, and mediating interactions, HIEs may, at times, recognize needs and initiate actions to evoke certain behaviors, to assure engagement and shift emotions. In other words, HIEs may play the role of a counsellor and/or spiritual guide. Teaching of skills or knowledge to evoke emotion may be particularly well-suited to the social exchanges necessary to support an ICE human. HIEs may curate gameplay between remote humans. A HIE might observe a human in its local environment, making a move on a board and then display the move to a human associated with a remote HIE, invoking a response from the human for another move and communicating the move. As HIEs engage in supporting social connection, either of the HIEs could add their own commentary, or play a role in the gameplay. For instance, a HIE could chuckle when its human makes a move, reward the human with a song, or collaborate and guide its human in a supportive or sneaky manner.

HIEs (human interaction entities) may be 1) physical, 2) virtual, or 3) a combination of physical and virtual, particularly at different times (e.g., a physical device when a user is seated and a related virtual avatar displayed on a mobile device when moving about). Physical HIEs may include robots (moveable or substantially stationary), robotic pets, robotic toys (e.g., dolls, baby-like figures), and human-like objects. Virtual HIEs may have features found in avatars, digital assistants, or synthesized persons or pets that may be displayed on computer monitors, screen, laptops, mobile devices (phones, tablets, smart watches, etc.) or other display devices including augmented reality, mixed reality and virtual reality headwear. Virtual HIEs may also be displayed as holograms, holographic-like projections, light-field projections, and other techniques that make video objects appear 3-dimensional.

In cases where a HIE comprises a physical device (or a collection of interacting or coupled devices), the acceptability of human interactions may be enhanced by movements, gestures, information displays, pointing, sounds, and other forms of HIE output or interaction. Actuators or other output components may include one or more video display devices, hologram display devices, holographic-like projectors, speakers, propulsion systems, servos, motors, magnetic field controllers, orientation controllers, haptic controllers, light and other forms of pointing devices, switch controllers, actuators for appendage control, and controllable tactile surfaces. HIE outputs may change, depending on time and circumstances. For example, a full range of HIE outputs may be utilized in a stationary environment while video-only exchanges are performed in a mobile setting and/or audio-only outputs are produced while driving. Generally, more freedom of movement is available using untethered (i.e., not connected to any fixed wired power or wired telecommunications source) HIEs, invoking a need for wireless telecommunications during at least a portion of the updating of a shared AIP data.

For the purposes of the present application, an AIP (artificial intelligence personality or artificial personality) is an understanding construct that interacts with one or more humans in a human-like or pet-like manner. An AIP may include a background or database of: 1) information, 2) memories and 3) experiences. At the core of an AIP is an artificial intelligence that may be implemented by a form of machine learning including convolution neural networks and/or other deep learning techniques. Neural networks may encompass large components of an artificial intelligence, such as actuator or motor control (of a HIE) to express a wide range of behaviors; or be segmented into sub-components that perform specific tasks, such as emotion recognition, searching strategies to acquire new information, word translation, facial feature recognition, and so on.

In exemplary embodiments, AIP information may: 1) be embedded within machinery (e.g., software, firmware and/or neural networks), or 2) include a capability of being able to search for information when needed using telecommunications such as the internet and/or the so-called "cloud." Some information may be specifically taught to an AIP, such as the birth dates of all of its users and their relatives and acquaintances. Other information may be known and available globally, accessed via search strategies that are known in the art. Searching and selecting information along with the ability to synthesize new information from such multiple sources greatly expands the "intelligence" component of an AIP.

AIP memories include those gathered using device sensors from the environment of one or more of its users. For example, the overall locations of a HIE (using, for example, GPS methods known in the art and/or forms of localization using object recognition to identify objects at known relative locations within video images) recorded over time or the time of day that an alarm rings may become an AIP memory. An aspect of the AIP is an ability to store selected memories (e.g., as permitted by each user) from the environments of two or more users. Such a common database may allow more meaningful behavioral interactions to be enacted to enable the AIP to more closely link the interactions of its users (e.g., separated by geographic distance).

AIP memories and experiences include those acquired using human interaction sensors as a result of interactions with AIP users. Such interactions are often multi-modal in nature, involving inputs from a number of sensors (audio, visual, tactile, etc.), sensing over a wide range of scales (e.g., camera sensors the detect small movements of the eyes, larger movement of the head, or gross gestures observed when viewing the entire body), and over a wide range of time scales (from milliseconds to years). Once again, the AIP may be able to more effectively share social interactions among users as a result of a common database of memories and experiences acquired from each user individually.

AIP memories and experiences may also include those acquired using HIE sensors as a result of interactions with one or more other HIEs. As with HIE-human interactions, physical HIE-HIE interactions are typically multi-modal in nature. HIE-HIE interactions may be between or among HIEs that share an AIP, or interactions may be among HIEs that are instantiated with different AIPs. In addition, HIE-HIE interactions may not necessarily involve physical contact. In other words, HIE-HIE interactions, particularly involving different AIPs, may occur in a virtual space (and/or over an accelerated time-frame compared to physical interactions). HIEs may also interact autonomously with the humans associated with HIEs instantiated with distinct AIPs, or with humans (pets, or other entities) that are not associated with any HIE. Once these HIE interactions occur, consequences and/or results of the interactions may be conveyed by the HIEs to their human counterparts (i.e., users).

In exemplary embodiments, an AIP may be designed to substantially share a single AIP among two or more HIEs. Even with a substantially common knowledge base, each user may be the recipient of a somewhat different AIP experience for a number of reasons:

1. During periods when there is a delay in communications associated with the distribution of updated AIPs, a "local" AIP may have recently acquired experiences that have not yet been transmitted to one or more "remote" AIPs.
2. An AIP for one or more individuals may be customized or tailored, for example, to accommodate special needs of an individual.
3. The sensed environment may require differing responses to the same interactions, for example to broadcast (audio) more loudly to accommodate a noisy environment.
4. While the AIP is a single personality, that is updated and adapts based upon new experiences, its interactions with users will vary based upon the specific circumstances, contexts, environments, and variable performance of each user.
5. As noted above, not all sensed information may be allowed to be distributed among all users. For example, acquired knowledge of medical records and measurements associated with any medical conditions (including undiagnosed, potential conditions) may be restricted to each individual user. This may include actions where the sensitive knowledge may be inferred, such as during discussions or physical interaction that would point to such a sensitive condition.

In exemplary embodiments, AIP interactions may be combined with archived data and sensed inputs to perform a substantially continuous assessment of human health and performance factors. Health assessments may include the monitoring of symptoms resulting from pre-existing conditions and/or the detection of new health issues. Performance assessments may include: 1) behavioral health (psychological and physiological well-being), 2) cognitive performance (memory and attention), 3) psychosocial performance (psychological strategies and social exchange), 4) task performance (goal-directed activities), and/or 5) teamwork (coordination and goal achievement). Such substantially continuous assessments may be performed in a covert manner (i.e., measurements particularly of the timing and content of human responses during the normal course of AIP interactions) or overtly, for example, by periodically performing performance tests that may be in the form of games or quizzes.

Additionally, once determined, one or more AIPs may be used within efforts to help mitigate the effects of some aspects of degraded human health and/or performance. For example, mitigation may include countermeasures that reduce the effects of separation of HIEs from their family and friends. Such countermeasures may be incorporated within the instantiation of one or more AIPs and/or include guidance from human sources (e.g., support personnel, advisors, doctors and/or other medical professionals).

In further embodiments, substantially continuous assessment of human health and performance factors may be used to assess the effectiveness of different countermeasures and their timing. Assessing the effectiveness of countermeasures may include measures involving one or more AIPs as well as those initiated and maintained by human sources. In effect, the substantially continuous assessment of performance during (and following) the application of countermeasures provides a feedback loop that may be used to enhance the performance of AIPs to maintain human health and performance. Enhanced performance of AIPs to maintain health and performance levels further enhances confidence, and subsequently outcomes, by AIP users.

In further exemplary embodiments, both the maintenance of (particularly mental) health and treatments of health conditions may be augmented by tasks, problem solving interactions and goals that are presented or augmented by the AIP. Inspired HIEs will strive for mastery of tasks, problems and/or goals. Mastery is motivated by the intrinsic value of achieving, learning, and self-improvement over the course of an experience. Providing positive experiences and connections improves expectations for successful outcomes and increases positive mood that contribute to positive feelings of hope, pride and gratitude.

In further exemplary embodiments, a user interacting with one HIE may be a Young Loved One, or YLO, such as a grandchild, child, niece, nephew, godchild or other youth. A user interacting with another HIE may be an Older Loved One, or OLO, such as a grandparent, parent, aunt, uncle, godparent, or other older person. The AIP may be developed to support the goal of achieving or improving the feelings of connectedness between a single YLO and a single OLO, multiple YLOs and a single OLO, multiple OLOs and a single YLO, or multiple YLOs and OLOs. The interactions between the users and their respective HIEs may include game playing, storytelling, sharing confidences, instruction, creating things, sharing ideas, teaching and learning, bonding activities, and other exchanges motivating feelings of connectedness, personal value, significance, relevance, importance, uniqueness, mutual respect, empathy, understanding, caring, and compassion.

FIG. 1 is a flowchart chart illustrating an exemplary sequence of computational and/or machine learning steps to substantially share a single AIP among two or more HIEs. $HIE_1$ interacts with one or more users in the vicinity or environment of $HIE_1$, and $HIE_2$ interacts with one or more users in the vicinity or environment of $HIE_2$. If an interaction occurs that includes $HIE_1$ 10a, then the results of this interaction (e.g., memories, experiences, new knowledge, skills) may be added to an interaction database 10b. Similarly, if an interaction occurs that includes $HIE_2$ 11a, then the results of this interaction may be added to the shared interaction database 11b. Optionally, and more generally to include any number of users and HIEs, if interactions occur that include $HIE_N$ 12a, then the results of these interactions (e.g., memories, experiences, new knowledge, skills) may added to a shared interaction database 12b.

As described in more detail below, interactions may involve multimodal inputs (see, e.g., FIG. 5) that generate a wide range of new knowledge, skills, and inferences. For example, a sentence spoken to a HIE by an interacting human may contain new information within the content of the words, convey several different emotional components (e.g., happiness, excitement, interest) in the way the words were spoken, indicate various physiological conditions (e.g., the speaker is awake and active), and/or acknowledge a cognitive understanding of previous actions or words spoken by the HIE. All such knowledge, skills, and inferences are held in the interaction database until they are used to update an AIP and/or user state (with timing caveats as described below, particularly in FIG. 10).

In general, the updating of an AIP 15 with new interaction data 14 may be computationally expensive and involve remote (i.e., not in the vicinity of a HIE device or display) processing resources. Thus, a machine decision 13 whether to update an AIP may be based a number of factors including: 1) the number of recent interactions, 2) interaction(s) content (e.g., importance, expressed excitement, social relevance related to shared AIP users), 3) availability of processing resources, and 4) elapsed time since the most recent AIP or user state update.

Some AIP updates 15 may involve updating only a subset of the AIP resources (e.g., sub-divided neural networks, memories, classifiers associated with different sensors). Updates may also involve the updating of user states 15. User states include the physical, physiological, cognitive and emotional status of a user. User states are derived data and are not strictly a part of the personality of an AIP, but user state may be used to modify the responses and actions of an AIP (see FIG. 6). It is typically most convenient to update a user state 15 using the cumulative interaction database 14 at the same time as updating and distributing AIPs.

As described in more detail within descriptions associated with FIGS. 9 and 10 below, when dealing with situations in which there are significant delays in distributing AIPs, transmitted updates of AIPs must contain sufficient information to allow an updated AIP to be re-computed based on the transmitted data set and the prior (i.e., not yet updated) AIP from which the new AIP was computed. This may include all sensor data leading up to the computation of the new AIP, specific AIP (network) differences between the prior and newly computed AIP, the entire new AIP (expensive from a bandwidth perspective), or sufficient derived data (e.g., changes in physical, physiological, cognitive and/or emotional states; gestures; recognized objects; spoken words; analysed movements) to compute an updated AIP.

Figure 2:
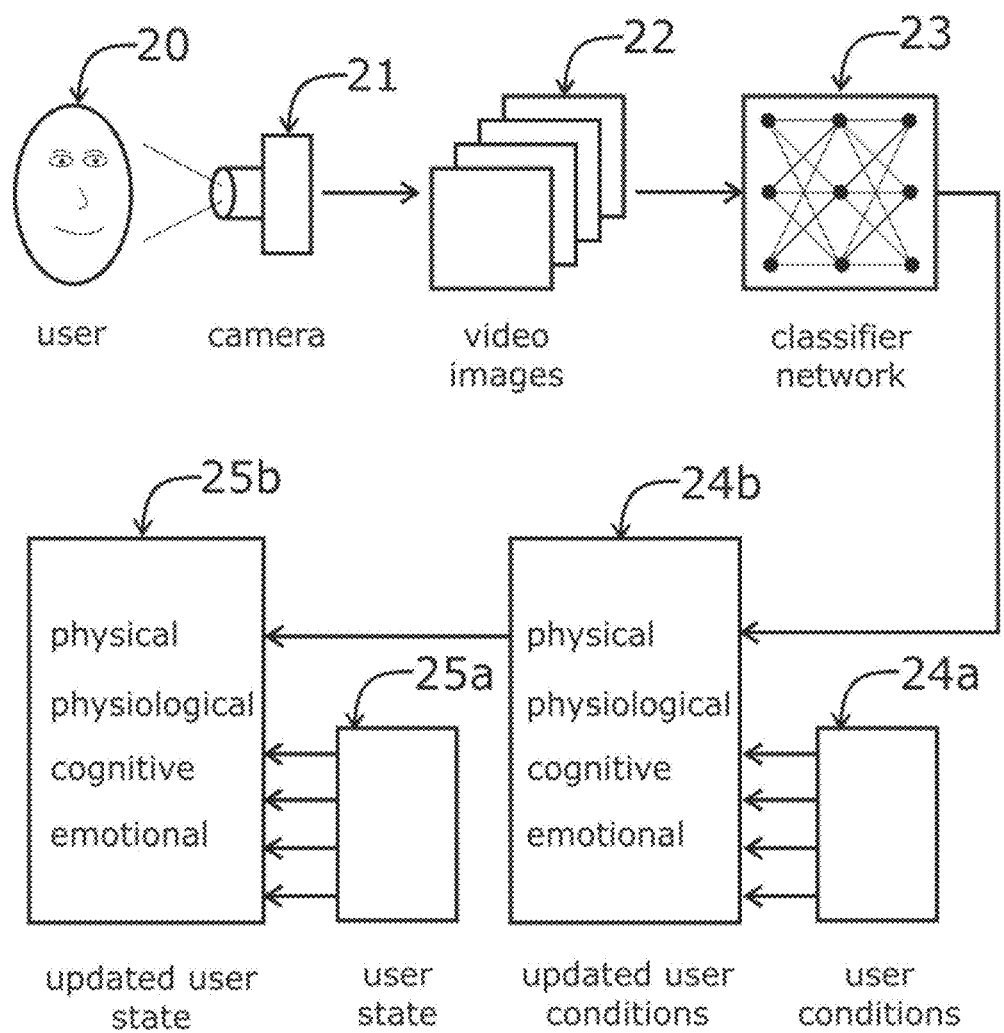
FIG. 2 illustrates a sequence of steps to re-compute an updated user state based on video input captured by one or more HIE cameras.

FIG. 2 illustrates the monitoring of a human user 20 using one or more cameras 21 that may be components of a HIE. The one or more cameras (optionally including distance-sensing elements) may be fixtures within a robot or pet-like device, or cameras may, for example, be embedded within mobile devices such as mobile phones, tablets, or laptops. Images 22 acquired from the one or more cameras 21 may be processed by classifier networks 23 and/or other image processing techniques that are known in the art to extract identified objects (e.g., head, eyes, mouth, arms, neck, fingers, torso), movements of objects (particularly relative to each other), and conditions that are associated with the appearances and/or movements of objects within the sensed video field.

Figure 5:
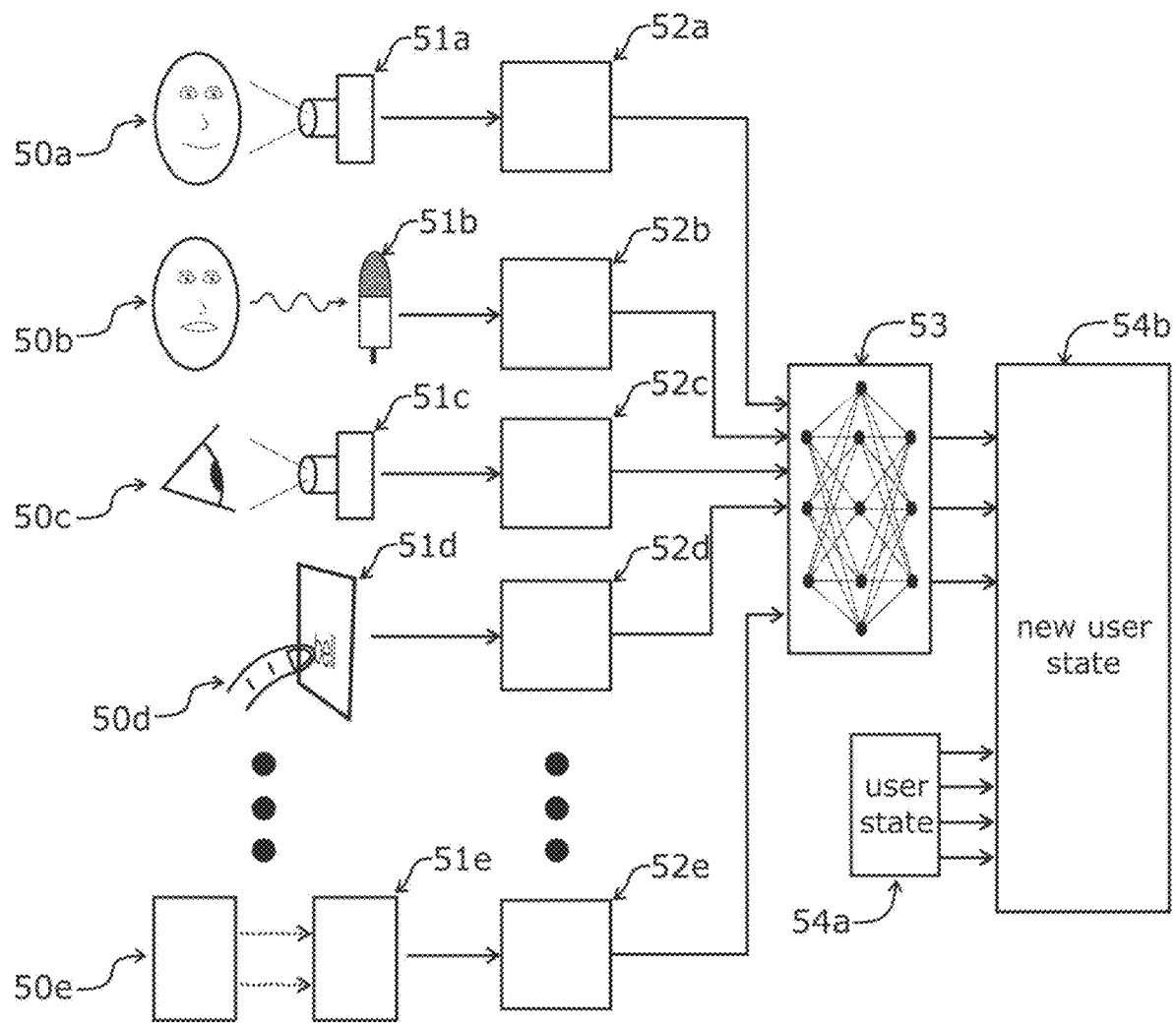
FIG. 5 shows a process to re-compute an updated user state based on simultaneous data acquisition via multiple HIE modalities.

In exemplary embodiments, user conditions may be classified based on the appearance and movements of objects within video fields. In FIG. 2, for the purposes of describing the general processes to determine and monitor the overall state of a user, two steps (user conditions 24a, 24b and user state 25a, 25b) are illustrated as overall steps to determine or update a final user state from classifier 23 results. However, in some instances, in order to determine a state of a user, more than just the observed conditions must be taken into account. For example, the classification 23 within images 22 of a frown or squint may be an indication of uncertainty, inability to see an object, intense sunlight, frustration, intense focus, or stress. These may be determined as potential current user "conditions" 24b using image classification techniques. When taking into account a user activity, such as performing a particularly challenging calculation, a user state of "intense focus" (and perhaps "uncertainty") may be determined from the possible user conditions. In some simpler cases (e.g., awake versus asleep), classifications may be unambiguous (e.g., not requiring context) and overall user state may be determined directly from classifiers (as illustrated in FIG. 5).

Both user conditions 24b and state 25b may be described in terms of categories that include: physical, physiological, cognitive and emotional components. Based on HIE observations and other measurements, current user conditions 24a and state 24b may be updated to new user conditions 24b and an updated user state 25b. As described more fully in descriptions of FIGS. 6 and 7, the state(s) of one or more users may modify the activities and exchanges of an AIP and state, particularly as a function of time, and may be a portion of an AIP's memory; however, one or more users' states are not a part of an AIP. The AIP has a substantially shared personality that is distinct from its users.

Figure 3:
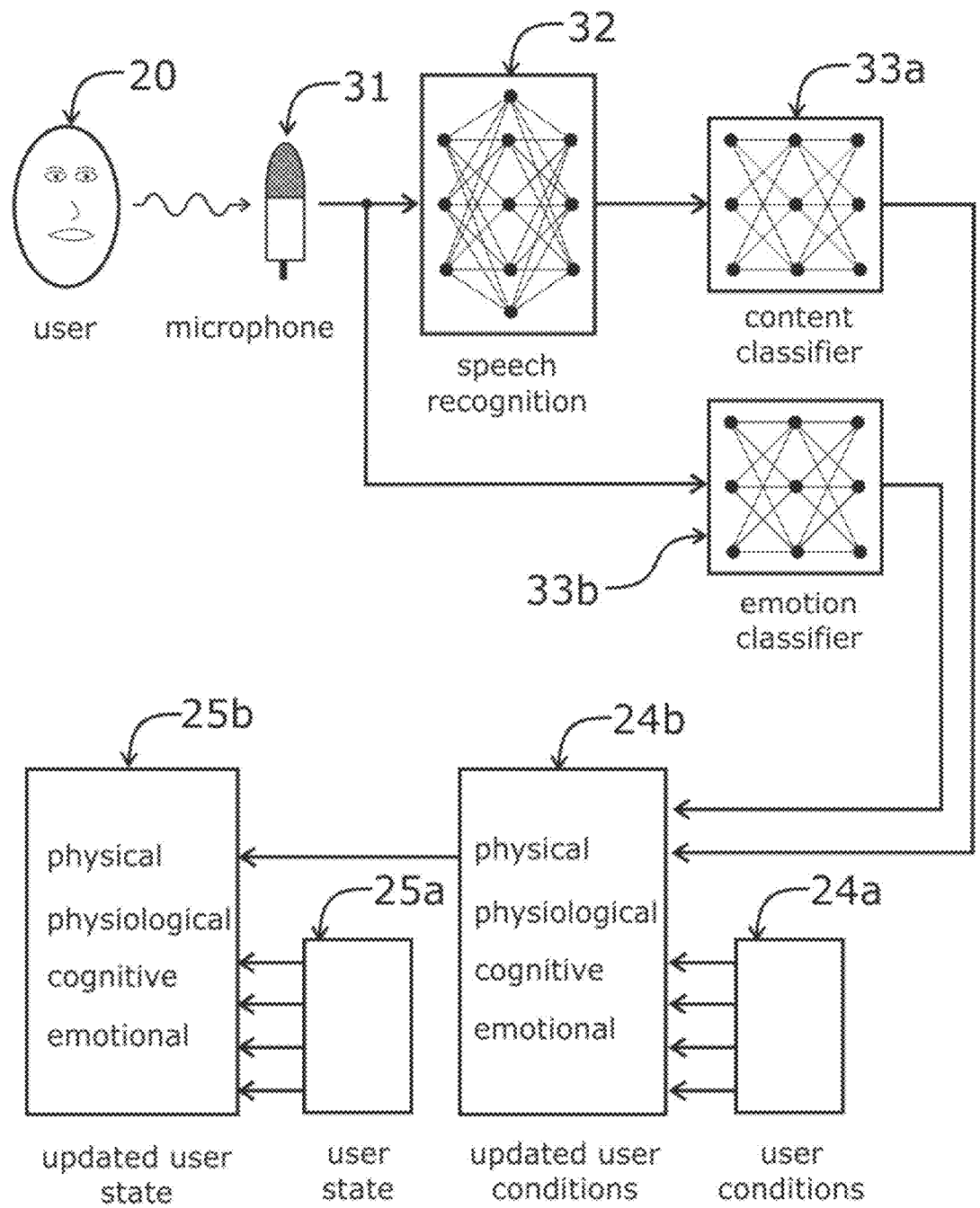
FIG. 3 illustrates a sequence of steps to re-compute an updated user state based on audio input acquired by one or more HIE microphones.

In further exemplary embodiments, FIG. 3 illustrates the monitoring of a human user 20 using one or more microphones 31 that may be components of a HIE. In the case of HIE audio input 31 from a user 20, new information may be discerned from both the content of the audio and how the audio is spoken. Thus, audio signals may be processed by multiple pathways, for example, to extract the content of speech using speech recognition techniques 32 that are known in the art; and classification techniques 33b to extract emotional content from the audio signals. The speech content produced by the speech recognition classified 32 may be further processed 33a to extract meaning and other information that may be used to update the current condition of the user (i.e., condition 24a updated to condition 24b), and may also be used to update the memories and shared experiences of the AIP (not illustrated in FIG. 3). The new user conditions 24b may be used to update the current user state 25a to an updated user state 25b.

Figure 4:
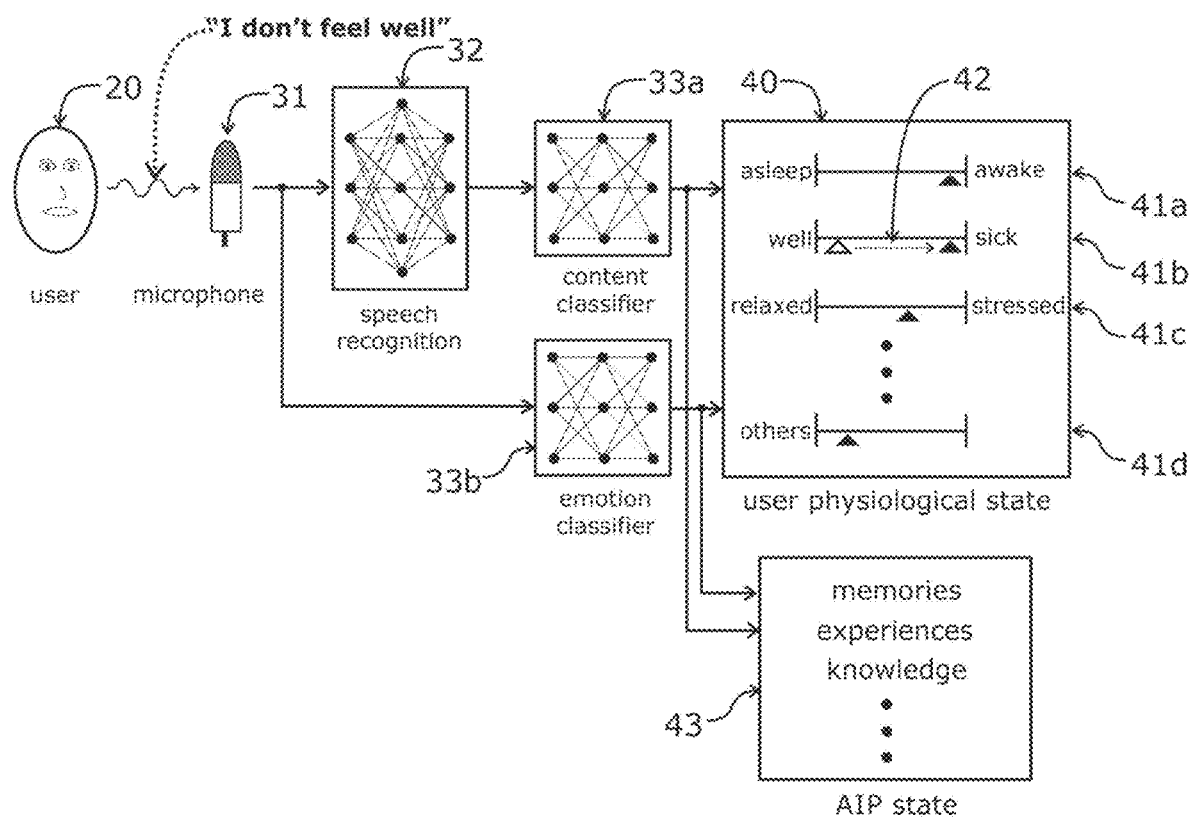
FIG. 4 is an example of updating the measured physiological condition of a user based on audio input acquired by a HIE.

FIG. 4 extends concepts in FIG. 3 to demonstrate the processing and consequences of uttering a specific phrase: "I don't feel well." The phrase spoken by a user 20 is detected by one or more microphones 31, processed using speech recognition techniques 32, and classified for both speech content 33a and emotional content 33b. The results of these classification are used to update both the user state 40 and the AIP state 43.

The information content of the spoken phrase in particular may be used to update a physiological state of the user 40. More specifically, as a consequence of uttering the phrase, one or more factors within the intelligence that describes the user state are adjusted to instantiate a "sick" condition 42 from the degree of wellness versus sickness 41b that was previously know about the user. Wellness versus sickness 41b is one the physiological factors that includes asleep versus awake 41a, relaxed versus stressed 41c, and a very large number of others 41d that make up the physiological state of a user. On the other hand, knowledge that the user is sick, the degree of perceived sickness, the time period over which the sickness appears to be occurring, and any (i.e., many other elements of) other information about the sickness may be incorporated into the memories, experiences, skills, and knowledge base of the substantially shared AIP.

In further exemplary embodiments, FIG. 5 demonstrates the simultaneous acquisition of multimodal data from a number of sensors 51a, 51b, 51c, 51d, 51e. For example, expression data may be acquired from a user's face 50a using one or more cameras directed at the face 51a. Vocalizations by the user 50b may be collected using one or more microphones 51b. Eye pointing or gaze directions 50c may be acquired based on video collected by one or more cameras directed at one or both eyes 51c. User intent may be determined based on the sensing of a user's finger 50d on a touch-sensitive screen 51d.

More generally, data may be acquired from any number of sensors 50e including: 1) device sensors that measure one or more elements within the environment of the HIE and/or user, and 2) human interaction sensors that measure interactions with the one or more human users. Device sensors may include one or more cameras, light sensors, thermal sensors, motion sensors, accelerometers, global positioning system (GPS) transceivers, microphones, infrared (IR) sensors, galvanometric sensors, pressure sensors, switch sensors, magnetic sensors, proximity sensors, date and time clocks, Bluetooth transceivers, and Wi-Fi transceivers. Human interaction sensors may include one or more cameras, thermal sensors, motion sensors, accelerometers, microphones, infrared (IR) sensors, galvanometric sensors, heart rate sensors, electrocardiogram sensors, electrooculogram sensors, electroencephalogram sensors, pulse oximeters, pressure sensors, magnetic sensors, computer mice, joysticks, keyboards, touch screens, and proximity sensors.

Each input modality may require differing degrees of pre-processing prior to being used as an input to a user state classifier 53 (possibly also involving one or more user conditions classifiers, see, e.g., description of FIG. 2). For example, object recognition 52a (of eyes, nose, mouth, chin, etc.) may be applied to data acquired by a camera 51a pointed at a face 50a. Speech recognition and or classification of emotional content 52b (see FIG. 3) may be applied to audio data. High spatial resolution eye tracking 52c may be applied to video images of one or both eyes. The contents of a touch-sensitive display 51d in the region being pointed to by a finger 50d may be determined 52d and passed on to the state classifier 53.

Simultaneously considering multimodal inputs from a constellation of sensors 51a, 51b, 51c, 51d, 51e enhances the robustness and accuracy of classification schemes 53. Once new conditions and/or states are determined, they may be used to update to a new user state 54b based, in part, on a previous user state 54; and to contribute to the knowledge, skills, memories and experiences of the shared AIP (see FIG. 4).

Figure 6:
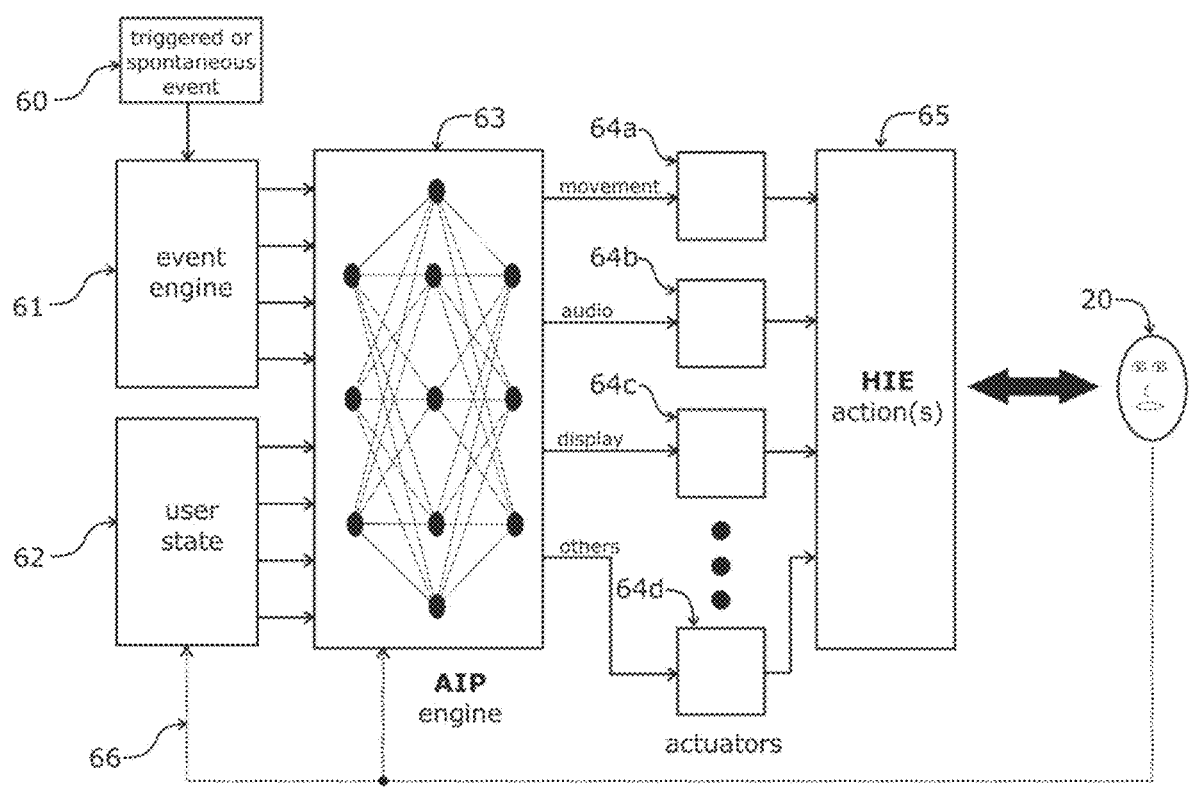
FIG. 6 illustrates a sequence of actuator steps for a HIE to perform a task in which actuator steps are modified by a user's sensed state.

In additional exemplary embodiments, FIG. 6 illustrates general steps demonstrating how an AIP 63 and user state 62 may be employed to structure the actions of a HIE 65. HIE actions 65 may be initiated spontaneously by the HIE or be the result of a "triggering event" 60 generated within the HIE as a result of acquired sensor data or resulting from data received via telecommunications. At appropriate times, HIEs may initiate 60 human interactions based on learned memories and experiences. Additionally, actions may be triggered 60, for example, to respond to a user's voice or movements, or result from an elapsed time since a prior event. Actions may also be triggered 60 as a result of the arrival of data from outside the environment of the HIE and user 20 (e.g., an incoming message, an instrument or device requiring attention, change in weather).

Once triggered, an event engine 61 may be used to acquire any additional necessary inputs for a HIE action 65 to be performed. Once ready, data are conveyed to the AI "personality" 63 to structure one or more actions 65. For example, a HIE response to an incoming message may be to move closer to the user 20, display the message, and/or broadcast the message (or sounds derived from the message) vocally.

HIE actions 65 may be modulated by the user's state 62 (or multiple states if multiple users are in the HIE environment). HIE actions are implemented using one or more actuators 64a, 64b, 64c, 64d that control various HIE output modalities. For example, HIE actions may involve movements 64a, vocalizations 64b, visual display 64c, and a wide variety of additional actions 64d. Responses by the user 20 to HIE actions may be used in a feedback mode to update 66 the user state 62 and the AIP 63, as illustrated in FIGS. 2 through 5.

Figure 7:
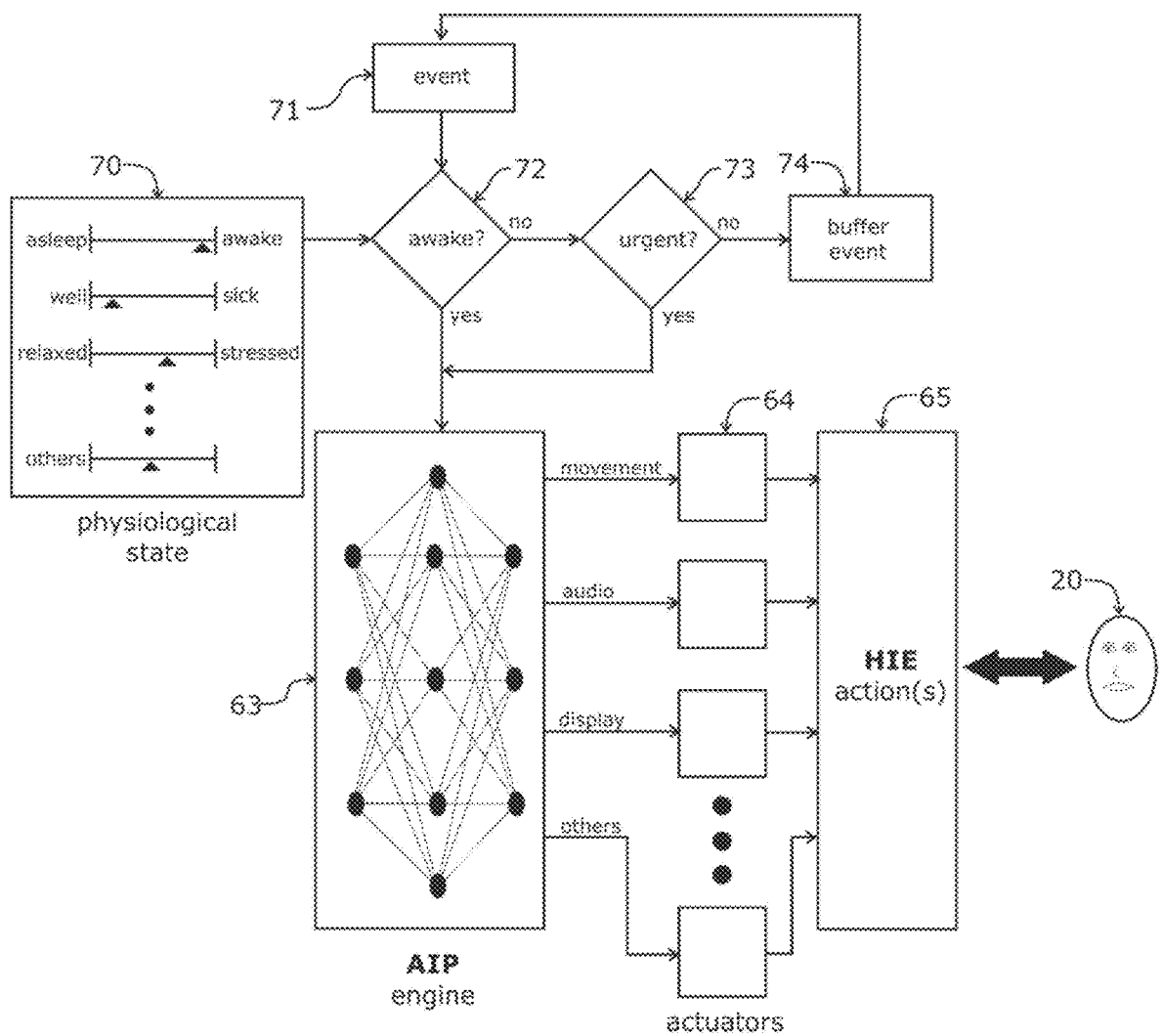
FIG. 7 is a simple example illustrating how the state of a user may be used to modify the actions of a HIE in which the awake versus sleep status of a user determines whether a notification action is performed.

In further exemplary embodiments, FIG. 7 illustrates a simple example of how one or more components of a user state may influence the action(s) of a HIE 65. In this example, an assessment by the HIE as to whether the user 20 is asleep versus awake 70 influences whether HIE actions 65 are performed. The asleep versus awake state is one of many components that make up a physiological state of a user 20.

As described above, the physiological state is, in turn, one component of factors that make up the overall user state.

In this example, based on a HIE assessment 72 that the user 20 is awake, an event may be passed on the AIP engine 63 to initiate and execute one or more action(s) 65 using any of the various actuators 64. If the user 20 is not awake, then an additional screening 73 of the event 71 is performed to determine if the event is urgent (e.g., a wake-up alarm, important message). If so, then the event is passed onto the AIP engine 63 to enact HIE action(s) 65. If not, the event is placed in a buffer 74 to be enacted at a later time. In general, a vast number of components of the user state may be used to modulate the outputs of a HIE.

Figure 8:
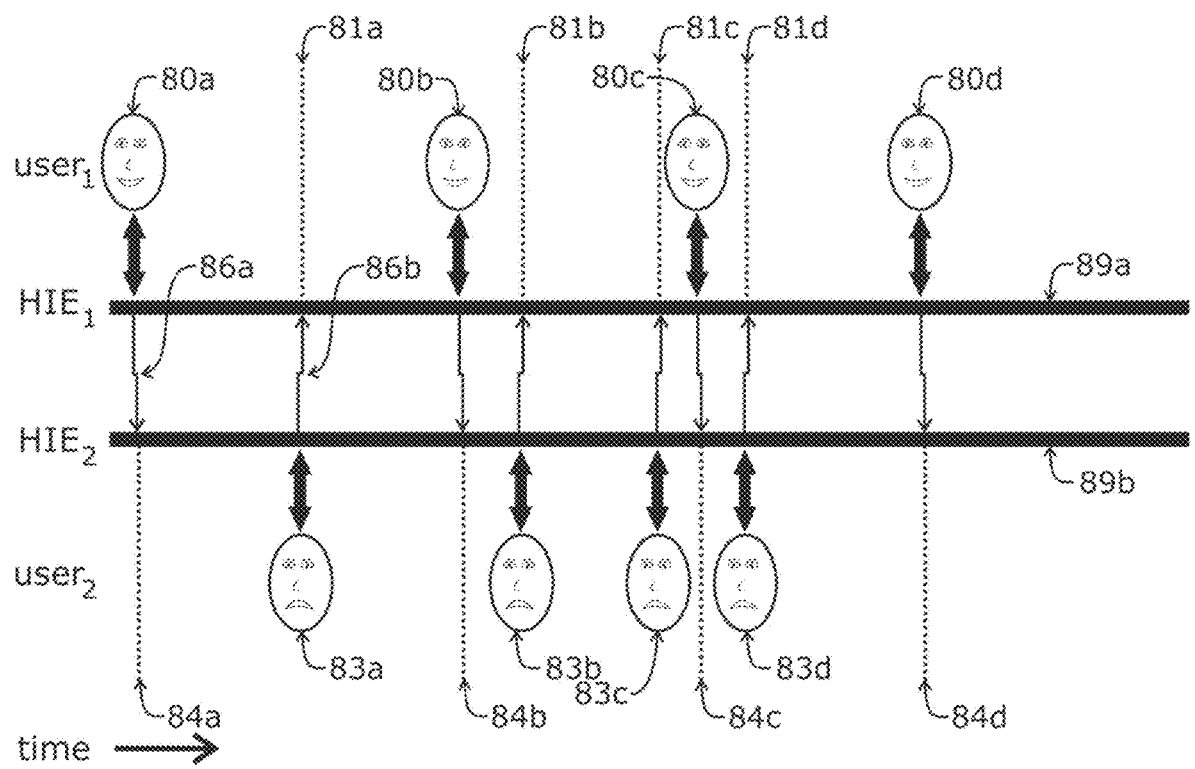
FIG. 8 illustrates a timeline of HIE-human interactions and resultant re-computations of an AIP when telecommunications support rapid updating (e.g., less than one second).

FIG. 8 illustrates exemplary timelines 89a, 89b of the updating of an AIP shared between two HIEs, $HIE_1$ interacting with $user_1$ (along timeline 89a) and $HIE_2$ interacting with $user_2$ (along timeline 89b). The locations of facial icons with double-ended arrows 80a, 80b, 80c, 80d, 83a, 83b, 83c, 83d along the timelines indicate the times of human-HIE interactions that result in updated AIPs. Transmissions of updated AIPs (and, if needed, user states and other data) are indicated by directed lines (e.g., 86a, 86b) between the timelines 89a, 89b where a downward-pointing line from the timeline associated with $HIE_1$ 89a toward the timeline associated with $HIE_2$ 89b (e.g., 86a) indicates a transmission from $HIE_1$ to $HIE_2$. Conversely, an upward-pointing line from the timeline associated with $HIE_2$ 89b toward the timeline associated with $HIE_1$ 89a (e.g., 86b) indicates a transmission from $HIE_2$ to $HIE_1$. The slight shifts in these lines (e.g., 86a, 86b) represents transmission delays in the indicated direction. Times of receipt of transmissions are indicated by vertical dashed lines 81a, 81b, 81c, 81d, 84a, 84b, 84c, 84d. Such transmissions may involve remote (so-called "cloud") and/or shared processing and transmission resources.

In the exemplary case of transmissions illustrated in FIG. 8, transmissions are rapid (e.g., less than one second). Thus, during the time of transmissions, it is unlikely that an update by a remote HIE occurs during the time it takes to initiate and transmit an update. This allows various (relatively simpler to code) handshaking schemes (e.g., so-called master-slave assignments or ready-to-send acknowledgements) to be implemented to avoid an update by a remote HIE during the time of transmission of an updated personality and/or user state. In cases where transmissions are consistently rapid, the temporary blocking of AIP updates by such schemes (e.g., for less than a second) may be generally not noticed by users. In FIG. 8, updates 80a, 80b, 80c, and 80d generated by $HIE_1$ are received by $HIE_2$ at times indicated by 84a, 84b, 84c, and 84d; respectively. Conversely, updates 83a, 83b, 83c, and 83d generated by $HIE_2$ are received by $HIE_1$ at times indicated by 81a, 81b, 81c, and 81d; respectively.

Figure 9:
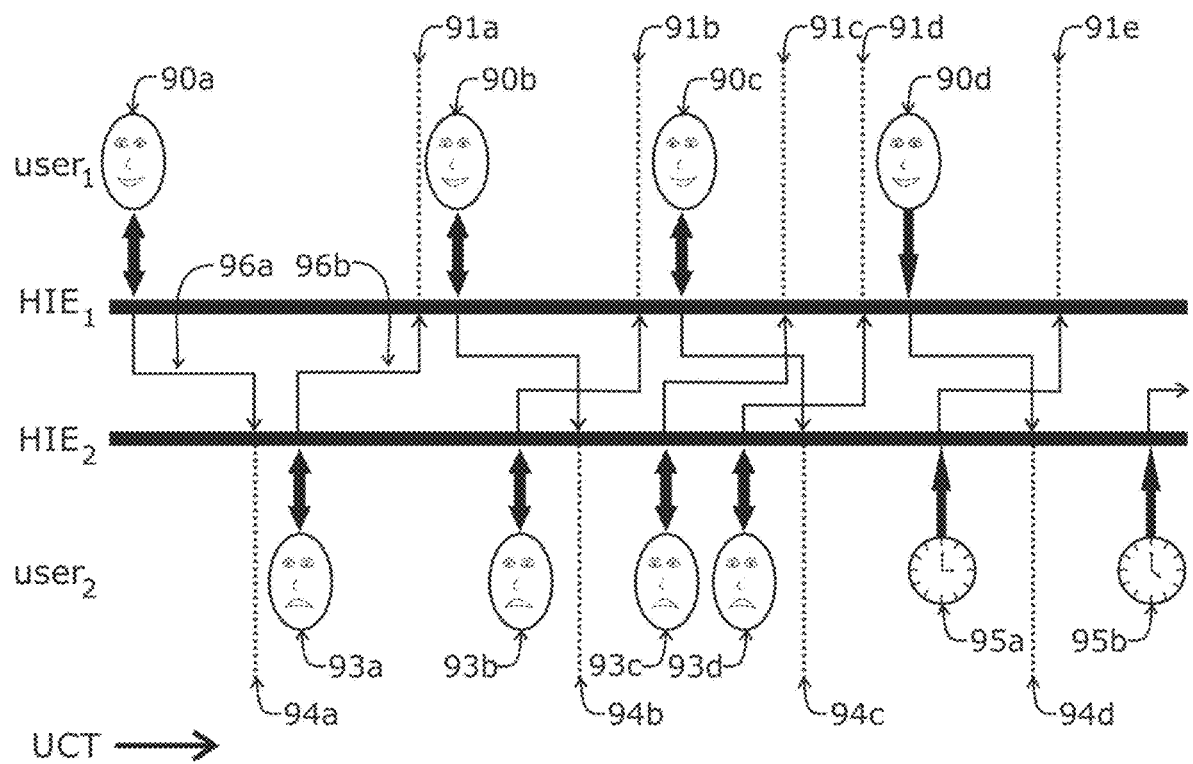
FIG. 9 illustrates a timeline of HIE-human interactions and resultant re-computations of an AIP when telecommunications are slow or interrupted (e.g., greater than one second).

In additional exemplary embodiments, FIG. 9 illustrates the timelines of updates by $HIE^1$ 80a, 80b, 80c, 80d and $HIE_2$ 83a, 83b, 83c, 83d initiated at roughly the same times as those 80a, 80b, 80c, 80d, 83a, 83b, 83c, 83d illustrated in FIG. 8. In this example, significant transmission delays (e.g., 96a, 96b) are shown in both directions (i.e. from $HIE_1$ to $HIE_2$ 96a and from $HIE_2$ to $HIE_1$ 96b). The delays illustrated in FIG. 9 are relatively constant over time and do not vary as a function of direction (i.e., transmitting or receiving). However, the same considerations (described below) may be made when (transmission or processing) delays vary (randomly or systemically) as a function of time or as a function of direction. Such delays may be a consequence, for example, of a low-bandwidth bottleneck in transmissions, a "noisy" transmission channel (requiring numerous re-transmissions of data packets), higher priority transmissions dominating the capacity of a limited-bandwidth transmission channel, or transmission times required to cover an extended distance between HIEs and/or processing resources.

When distances become very large, such as those encountered by astronauts, special (i.e., space-time) conditions must be considered when synchronizing the "time" of HIE timelines such as those illustrated in FIG. 9. When distances are short (and absent extremely large accelerations) timelines can be readily synchronized to a single (e.g., so-called "universal") time. In most terrestrial settings, this can be a single clock such as "coordinated universal time" (abbreviated UTC) which also corresponds (in practice) to Greenwich Mean Time (GMT).

However, when distances are large and/or accelerations are extreme, such as those that may be encountered during space travel, then the synchronization of clocks (and therefore knowing the time a new AIP was computed) becomes more complex. In the case of large distances (absent accelerations) effects are described by Einstein's theory of special relativity. Einstein's general theory of relativity must be invoked to predict the effects of (gravitational) accelerations, including those of an orbiting spacecraft around a large body such as a planet or moon. In fact, given the orbital position of satellites that implement modern-day global positioning systems (GPSs), localization measurements would fail within about two minutes absent calculations of the effects of the satellites' orbital paths around the earth due to special relativity (slowing by about seven microseconds/day) and general relativity (accelerating by about forty eight microseconds/day), with a net time shift on earth of about thirty eight microseconds/day.

The effects of both special and general relativity may be computed if trajectories (i.e., positions as a function of time) are known and/or predictable. This is the case (for the foreseeable future, and particularly absent any substantial effects of friction in space) for astronaut travel and stations within orbiting satellites, moons and planets. Thus, a modified time stamp may be computed that takes into account where the packets of information associated with an AIP (and, if needed, user state and other data) originate (i.e., relative to the location of a receiving station). In the description below, this is referred to as a "universal" corrected time ("UCT," see FIGS. 9 and 10, intentionally distinguishing the acronym from its terrestrial analog, UTC).

The exact solutions for the corrections in clocks (i.e., time) for general trajectories are derived from a series of (tensor) equations similar to (in fact, historically derived from) Maxwell's equations. For complex trajectories, corrected time may be computed using numerical integration techniques. For simple trajectories, relatively simple solutions have been derived and may be used under many conditions and/or as first approximations.

The shift in time due to special relativity may be estimated from $$T = T_o \sqrt{1 - v^2/c^2}$$

where T is the corrected time in the reference frame the observer (i.e., the receiver of an AIP data set), $T_o$ is the time measured by the sender (i.e., transmitter), v is the velocity of the sender, and c is the speed of light in a vacuum, 299792.458 kilometers/second.

The shift in time due to special relativity may be estimated from $$t_o = t_f \sqrt{1 - 2GM/rc^2}$$

where $t_o$ is the corrected time for a (slower ticking) observer (e.g., a terrestrial receiver of an AIP data set) within a gravitational field, $t_f$ is the (faster ticking) time at distance r from the center of the large object generating the gravitational field (e.g., earth, moon, Mars), G is the gravitational constant, $6.674 \times 10^{-11}$ $m^3 kg^{-1} s^{-2}$, and M is the mass of the object creating the gravitational field. The mass of the earth is approximately $5.972 \times 10^{24}$ kilograms; the mass of the moon is approximately $7.347 \times 10^{22}$ kilograms; and the mass of Mars is approximately $6.39 \times 10^{23}$ kilograms.

In FIG. 9, a $HIE_1$ interaction 90a results in a local AIP update that is transmitted to $HIE_2$, arriving at the time (i.e., UCT) indicated by 94a. Similarly, a $HIE_2$ interaction 93a results in an AIP update that is transmitted to $HIE_1$, arriving at the time indicated by 91a. In both of these cases, no additional AIP updates occurred during the times of the transmissions and both HIEs were updated with substantially the same AIP (and, if needed, user states and other data). The AIP was updated in the chronological order that HIE interactions occurred. In all cases described herein, an "interaction" may result from a single measurement by a HIE or a cluster of measurements (from seconds to hours) to make up an interaction that results in an AIP update (dependent, at least in part, on user preferences).

In the exemplary timeline shown in FIG. 9, a $HIE_1$ interaction 90b results in a local AIP update that is transmitted to $HIE_2$, arriving at the time indicated by 94b. During this transmission time, a $HIE_2$ interaction occurred 93b resulting in an AIP update that is transmitted to $HIE_1$, arriving at the time indicated by 91b. If $HIE_1$ were to simply update its AIP based on the remote AIP data received at time 91b, then interaction 90b would be "missed" or "forgotten" since those data were not known to $HIE_2$ when the AIP resulting from interaction 93b was computed and transmitted.

Figure 10:
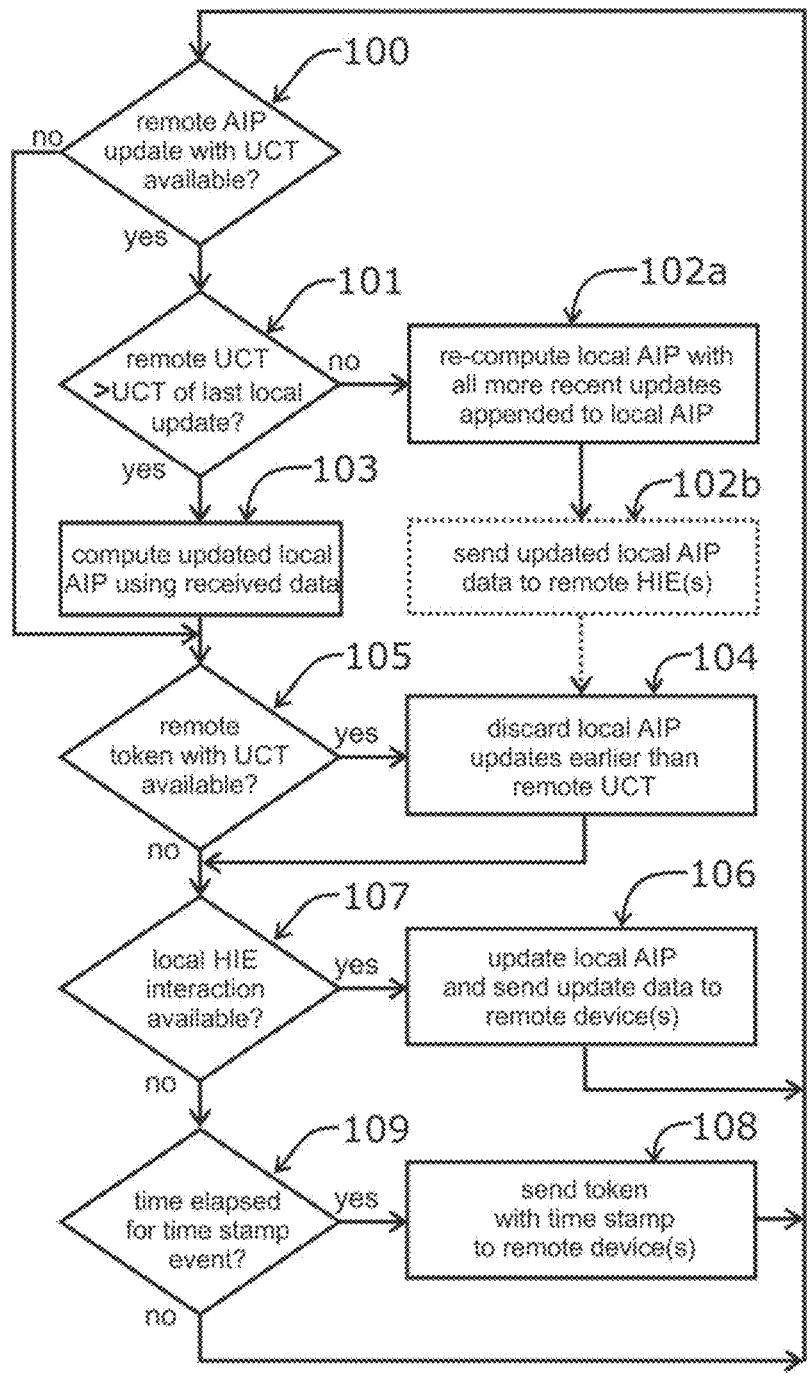
FIG. 10 is a flow chart of an exemplary sequence of steps to maintain an updated AIP when telecommunications are slow or interrupted (e.g., greater than one second).

A solution to this, depicted more fully in FIG. 10, is to temporarily maintain all newly generated interaction data (and/or any other forms of new data) with time stamps until all sources have acknowledged that they are up-to-date compared with the earliest UCTs transmitted from all HIEs. When the possibility of "missed" data due to transmission delays exists, all AIP updates must include sufficient data to re-construct the update (e.g., interaction measurements or derivative data that triggered the update). When an update from a remote HIE is received in which one or more interactions are missing, an updated AIP is re-computed in which all (local and remote) interaction data sets are appended to the last known valid AIP in chronological order (see FIG. 10).

Optionally, the newly computed AIP may then be transmitted back to all other HIEs, keeping them up-to-date (not illustrated in FIG. 9). Whether the newly computed AIP is transmitted at this stage depends on the desire of users to remain as up-to-date as possible regarding all most recent interactions by other user(s). If not transmitted immediately, the newly computed AIP data may be transmitted during the next clocked event (i.e., "token" event, see below) or when a new local interaction occurs. In the case of data associated with $HIE_2$ interaction 93b received by $HIE_1$ at time 91b, the next data set is transmitted following $HIE_1$ interaction 90c.

In FIG. 9, by the time data associated with $HIE_1$ interaction 90c are received by $HIE_2$ at time 94c, two additional $HIE_2$ interactions 93c, 93d have occurred. Thus, without a scheme to re-compute AIPs in the chronological order in which they occurred (or to computed substantially similar AIPs by at least ensuring that all interactions are included), both of these interactions 93c, 93d would be "missed" or "forgotten" within the data received by $HIE_2$ at time 94c. Similarly, without such a scheme, data sets received by $HIE_1$ at times 91c and 91d would not contain information about $HIE_1$ interaction 90c.

Under some conditions, such as when a user leaves the vicinity of a HIE or goes to bed, no interactions may be generated for a substantial period of time and, consequently, no interaction data are transmitted. In cases where one or more other users remain active, this may result in a need for storing (e.g., for hours to days) substantial interaction data that may be required to re-compute AIPs, as just described above. In order to avoid this situation, HIEs may periodically transmit events triggered by a clock to ensure there are no periods of extended inactivity. This may be considered a token event (or so-called "token") in which transmitted data contain, at a minimum, a time stamp. If desired, other housekeeping (i.e., non-interaction) data may also be included. When a token is received, a receiving HIE may be assured that the sending HIE has no other events to report up to the time of the token's time stamp, allowing interaction data up to the time of the time stamp to be discarded.

In FIG. 9, $HIE_2$ transmits token events at times 95a and 95b. The event transmitted by $HIE_2$ at time 95a is received by $HIE_1$ at time 91e. At this time, HIE1 may discard the data associated with $HIE_1$ interaction 90d, since it occurred prior to the time recorded within the $HIE_2$ token time stamp 95a.

In further exemplary embodiments, FIG. 10 is a flow chart representing the overall steps that may maintain a substantially shared AIP involving two or more users when transmission times between HIEs (and any intermediary processors) are significant (e.g., greater than one second). FIG. 10 may be best understood in conjunction with the timing diagram illustrated in FIG. 9. When an AIP update arrives 100 from a remote processor, a determination is made whether the received UCT (corrected for any effects due to special or general relativity, as described above) is more recent than the UCT of the most recent local AIP update. If so, then the received AIP data may be used to update the local AIP 103.

If the received UCT is earlier than the last local update (i.e., the "no" state in 101), then an event has occurred during the time of transmission. In this case, the local AIP is re-computed 102a based on the last valid AIP (prior to the remote event) updated by the new remote data and all more recent updates (that may include updates from remote HIEs if more than two HIEs are involved). A chronological order of updates to the AIP may be maintained. Optionally, the newly re-computed AIP data may be re-transmitted to remote HIE(s) 102b if user preferences dictate maintenance and interchange of all most recent updates possible (at the expense of transmission and computing resources).

Once re-computed, any AIP update data sets pertaining to updates prior to the received UCT (or the earliest received UCT if more than two HIEs are involved) may be discarded 104. Additionally, if a remote "token" (see description for FIG. 9) is received 105, then any AIP update data sets prior to the received token UCT (or earliest received UCT if more than two HIEs are involved) are discarded 104.

If a local HIE interaction triggers the calculation of a new AIP 107, then update data are sent to all remote devices 106.

Otherwise, a determination is made whether sufficient time has elapsed since the last transmission 109, and, if so, then to transmit a "token" event (absent any AIP update data) to remote devices 108. In this way, all devices are eventually updated with all AIP interaction updates (in chronological order, if desired), even in the presence of significant transmission issues and/or significant propagation delays.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method to share an artificial intelligence personality among multiple human interaction entities to support social connectedness between two humans, comprising:
   providing, in proximity to a first human, a first human interaction entity comprising a first electronic device that includes a first processor, a first entity communication interface, one or more first interaction output devices operatively coupled to the first processor, and one or more first sensors operatively coupled to the first processor;
   providing, in proximity to a second human, a second human interaction entity comprising a second electronic device that includes a second processor, a second entity communication interface, one or more second interaction output devices operatively coupled to the second processor, and one or more second sensors operatively coupled to the second processor;
   instantiating, with the first processor, a first artificial intelligence personality into the first human interaction entity;
   performing, with the first artificial intelligence personality instantiated within the first human interaction entity, an interaction with the first human;
   acquiring during the interaction, interaction data from the one or more first sensors related to the interaction of the first human with the first artificial intelligence personality;
   transmitting to one or more artificial intelligence processors, via the first entity communication interface, the interaction data;
   computing, with the one or more connected artificial intelligence processors, a second artificial intelligence personality based at least in part on the first artificial intelligence personality and the interaction data;
   transmitting from the one or more connected artificial intelligence processors to the second processor, the second artificial intelligence personality;
   instantiating, with the second processor, the second artificial intelligence personality into the second human interaction entity; and
   indicating, with the second artificial intelligence personality via one or more of the second interaction output devices, a desire by the first human to connect with the second human,
   wherein the second artificial intelligence personality and the first artificial intelligence personality comprise a single cumulative personality that is updated by the one or more connected artificial intelligence processors based at least in part on the interaction data acquired during interactions between the first human and the first artificial intelligence personality, and
   wherein instantiating the first artificial intelligence personality into the first human interaction entity comprises installing the first artificial intelligence personality with the first processor such that the first artificial intelligence personality interacts with the first human via the one or more first interaction output devices.

2. The method of claim 1, wherein the first human interaction entity is one of a robot, a robotic pet, a toy, an avatar, a displayed image, a virtual reality object, an augmented reality object, a hologram, and a hologram-like projection.

3. The method of claim 1, wherein the one or more first sensors comprise one or more of environmental sensors comprising sensors measuring one or more elements within the environment of the first human interaction entity, and human interaction sensors comprising sensors measuring interactions between the first artificial intelligence personality and the first human.

4. The method of claim 3, wherein the environmental sensors comprise one or more of cameras, light sensors, thermal sensors, motion sensors, accelerometers, global positioning system (GPS) transceivers, microphones, infrared (IR) sensors, galvanometric sensors, pressure sensors, switch sensors, magnetic sensors, proximity sensors, date and time clocks, Bluetooth transceivers, and Wi-Fi transceivers.

5. The method of claim 3, wherein the human interaction sensors comprise one or more of cameras, thermal sensors, motion sensors, accelerometers, microphones, infrared (IR) sensors, galvanometric sensors, heart rate sensors, electrocardiogram sensors, electrooculogram sensors, electroencephalogram sensors, pulse oximeters, pressure sensors, magnetic sensors, computer mice, joysticks, keyboards, touch screens, and proximity sensors.

6. The method of claim 3, wherein the interaction data comprise one or more of:
   data acquired from one or more of the environmental sensors,
   data acquired from one or more of the human interaction sensors,
   physical states of one or more humans within the vicinity of the first human interaction entity,
   physiological states of one or more humans within the vicinity of the first human interaction entity,
   cognitive states of one or more humans within the vicinity of the first human interaction entity, emotional states of one or more humans within the vicinity of the first human interaction entity, changes in the physical, physiological, cognitive, or emotional states of one or more humans within the vicinity of the first human interaction entity, one or more spoken words within the vicinity of the first human interaction entity, one or more recognized objects within images acquired by the first human interaction entity, and one or more gestures performed by one or more humans within the vicinity of the first human interaction entity.

7. The method of claim 1, wherein the one or more first interaction output devices comprise one or more of video display devices, hologram display devices, holographic-like projectors, speakers, propulsion systems, servos, motors, magnetic field controllers, orientation controllers, haptic controllers, light pointing devices, switch controllers, and controllable tactile surfaces.

8. The method of claim 1, wherein additional artificial personalities are determined from data that include one or more of additional interaction data from the first human interaction entity, second interaction data from the second human interaction entity, and additional interaction data from additional human interaction entities.

9. The method of claim 8, wherein the additional artificial personalities are computed by one or more of the first human interaction processor, the second human interaction processor, additional human interaction processors, and one or more connected artificial intelligence processors.

10. The method of claim 9, wherein, once computed, the additional artificial intelligence personalities are transmitted to one or more of the first human interaction processor, the second human interaction processor, and additional human interaction processors.

11. The method of claim 1, wherein instantiating the first human interaction entity and the second human interaction entity with the second artificial intelligence personality occurs, within less than one second; or following a delay, greater than or equal to one second.

12. The method of claim 11, wherein an artificial intelligence is maintained in human interaction entities during one or more of interrupted transmission, erroneous transmission, computational delays, and propagation delays.

13. The method of claim 1, wherein a relative difference in time between a transmission of update date and a receiving of update data takes into account one or more of:

relative changes in time due to a velocity of a sending device relative to a receiving device as described by Einstein's special theory of relativity, and relative changes in time due to an acceleration of the sending device relative to the receiving device as described by Einstein's general theory of relativity.

14. A system to share an artificial intelligence personality among multiple human interaction entities to support social connectedness between two humans, comprising:

a first human interaction entity configured to be located in proximity to a first human, comprising a first electronic device that includes a first processor, a first entity communication interface, one or more first interaction output devices operatively coupled to the first processor that actuates interactions between the first human interaction entity and the first human, and one or more first sensors operatively coupled to the first processor that sense interactions between the first human interaction entity and the first human, the first human interaction entity configured to instantiate a first artificial intelligence personality;

a second human interaction entity configured to be located in proximity to a second human comprising a second electronic device that includes a second processor, a second entity communication interface, one or more second interaction output devices operatively coupled to the second processor that actuates interactions between the second human interaction entity and the second human, and one or more second sensors operatively coupled to the second processor that sense interactions between the second human interaction entity and the second human;

one or more connected artificial intelligence processors that receive interaction data acquired during an interaction between the first human interaction entity and the first human transmitted via the first entity communication interface, the one or more connected artificial intelligence processors configured to determine a second artificial intelligence personality based at least in part on the first artificial intelligence personality and the interaction data; and a coordinating processor configured to send data to compute the second artificial intelligence personality from the one or more connected artificial intelligence processors to the second processor that instantiates the second human interaction entity with the second artificial intelligence personality, wherein the second artificial intelligence personality is configured to be instantiated within the second human interaction entity to indicate, via one or more second interaction output devices, a desire by the first human to connect with the second human, wherein the second artificial intelligence personality and the first artificial intelligence personality comprise a single cumulative personality that is updated by the one or more connected artificial intelligence processors based at least in part on the interaction data acquired during interactions between the first human and the first artificial intelligence personality, and wherein the first processor is configured to instantiate the first artificial intelligence personality into the first human interaction entity by installing the first artificial intelligence personality such that the first artificial intelligence personality interacts with the first human via the one or more first interaction output devices.

15. The system of claim 14, wherein the data sent by the coordinating processor to instantiate the second artificial intelligence personality comprise one or more of:

data acquired from one or more of the first sensors;

physical states of one or more humans within the vicinity of the first human interaction entity;

physiological states of one or more humans within the vicinity of the first human interaction entity;

cognitive states of one or more humans within the vicinity of the first human interaction entity;

emotional states of one or more humans within the vicinity of the first human interaction entity;

changes in the physical, physiological, cognitive, or emotional states of one or more humans within the vicinity of the first human interaction entity;

one or more spoken words within the vicinity of the first human interaction entity;

one or more recognized objects within images acquired by the first human interaction entity;

one or more gestures performed by one or more humans within the vicinity of the first human interaction entity;

one or more differences between the first artificial intelligence personality and the second artificial intelligence personality; and an entire data set representing an artificial intelligence personality.

16. A method to share an artificial intelligence personality among multiple human interaction entities to support social connectedness between two humans, comprising:

providing, in proximity to a first human, a first human interaction entity comprising a first electronic device that includes a first processor, one or more first interaction output devices operatively coupled to the first processor, and one or more first sensors operatively coupled to the first processor;

providing, in proximity to a second human, a second human interaction entity comprising a second electronic device that includes a second processor, one or more second interaction output devices operatively coupled to the second processor, and one or more second sensors operatively coupled to the second processor;

instantiating, with the first processor, a first artificial intelligence personality into the first human interaction entity;

performing, with the first artificial intelligence personality instantiated within the first human interaction entity, an interaction with the first human;

acquiring during the interaction, interaction data from the one or more first sensors related to the interaction of the first human with the first artificial intelligence personality;

computing, with one or more connected artificial intelligence processors, a second artificial intelligence personality based at least in part on the first artificial intelligence personality and the interaction data; and instantiating, with the second processor, the second artificial intelligence personality into the second human interaction entity;

wherein the second artificial intelligence personality and the first artificial intelligence personality comprise a single cumulative personality that is updated by the one or more connected artificial intelligence processors based at least in part on the interaction data acquired during interactions between the first human and the first artificial intelligence personality, and wherein instantiating the first artificial intelligence personality into the first human interaction entity comprises installing the first artificial intelligence personality with the first processor such that the first artificial intelligence personality interacts with the first human via the one or more first interaction output devices.

17. The method of claim 16, wherein the first human interaction entity is one of a robot, a robotic pet, a toy, an avatar, a displayed image, a virtual reality object, an augmented reality object, a hologram, and a hologram-like projection.

18. The method of claim 16, wherein the one or more first sensors comprise one or more of environmental sensors comprising sensors measuring one or more elements within the environment of the first human and one or more human interaction sensors comprising sensors measuring interactions between the first artificial intelligence entity and the first human.

19. The method of claim 18, wherein the one or more environmental sensors comprise one or more of cameras, light sensors, thermal sensors, motion sensors, accelerometers, global positioning system (GPS) transceivers, microphones, infrared (IR) sensors, galvanometric sensors, pressure sensors, switch sensors, magnetic sensors, proximity sensors, date and time clocks, Bluetooth transceivers, and Wi-Fi transceivers.

20. The method of claim 18, wherein the one or more human interaction sensors comprise one or more of cameras, thermal sensors, motion sensors, accelerometers, microphones, infrared (IR) sensors, galvanometric sensors, heart rate sensors, electrocardiogram sensors, electrooculogram sensors, electroencephalogram sensors, pulse oximeters, pressure sensors, magnetic sensors, computer mice, joysticks, keyboards, touch screens, and proximity sensors.

* * * * *